United States Patent [19]
Anazawa et al.

[11] Patent Number: 5,812,722
[45] Date of Patent: Sep. 22, 1998

[54] OPTICAL FIBER AND METHOD FOR MANUFACTURING THE SAME

[75] Inventors: Kazunori Anazawa; Hiroyuki Watanabe; Masaaki Shimizu, all of Minami-ashigara, Japan

[73] Assignee: Fuji Xerox Co., Ltd., Tokyo, Japan

[21] Appl. No.: 753,893

[22] Filed: Dec. 2, 1996

[30] Foreign Application Priority Data

Dec. 5, 1995 [JP] Japan .................................. 7-316853

[51] Int. Cl.⁶ .............................. G02B 6/02; G02B 21/00
[52] U.S. Cl. .............................. 385/123; 385/43; 385/27; 359/368
[58] Field of Search .................................. 385/15, 12, 27, 385/28, 31, 32, 33, 38, 39, 43, 49, 123, 128, 127, 133, 147, 901, 902; 606/16, 3; 250/306, 311; 359/368

[56] References Cited

U.S. PATENT DOCUMENTS

| | | | |
|---|---|---|---|
| 5,168,538 | 12/1992 | Gillespie | 385/123 |
| 5,394,500 | 2/1995 | Marchman | 385/123 |
| 5,570,441 | 10/1996 | Filas et al. | 385/43 |
| 5,627,922 | 5/1997 | Kopelman et al. | 385/12 |
| 5,664,036 | 9/1997 | Islam | 385/31 |

OTHER PUBLICATIONS

Pangaribuan, Togar et al., "Reproducible Fabrication Technique of Nanometric Tip Diameter Fiber Probe for Photon Scanning Tunneling Microscope", *Japan J. Appl. Phys.*, vol. 31, pp. 1302–1304, 1992.

*Primary Examiner*—Brian Healy
*Attorney, Agent, or Firm*—Oliff & Berridge, PLC

[57] ABSTRACT

In an optical fiber comprising a core, and a clad which has a smaller refractive index than that of the core and with which the core is covered, an tip portion of the core has the most pointed portion which is in a conical form and has the top of an acute angle of $\theta 1$. Furthermore, the tip portion of the core has a core tip peripheral portion which is contiguous to the most pointed portion and has a slant of a gentler incline than the acute angle $\theta 1$. The optical fiber is used for, e.g., a probe.

16 Claims, 2 Drawing Sheets

OPTICAL FIBER AND METHOD FOR MANUFACTURING THE SAME

BACKGROUND OF THE INVENTION

1. Field of the Invention

The present invention relates to an optical fiber, and more particularly to an optical fiber suitable for e.g., a probe which has a sharpened tip and which is used in a microscope for probing a surface of a sample, in particular a photon scanning tunneling microscope (hereinafter abbreviated to a PSTM); and to a process for manufacturing the same.

2. Description of Related Art

The PSTM is a device for observing a microscopic structure of a sample or accomplishing local spectroscopy by detecting evanescent light generated from the microscopic structure of the sample or applying evanescent light to the microscopic area of a sample. An optical fiber is used as a probe of the PSTM. The optical fiber is required to be processed to have a sharp tip for meeting a requirement as a probe. The method for sharpening the tip conventionally comprises the step of chemical etching with an HF base solvent. It is known that an angle of the tip of an optical fiber processed in this manner depends on the amount of a dopant, $GeO_2$ in the optical fiber. The more the amount of the dopant $GeO_2$ is, the sharper the tip is. At present, optical fibers are manufactured which have a tip angle of 20 degrees and a tip curvature radius of 10 nm or less. They are used as a probe of the PSTM.

However, an optical fiber doped with $GeO_2$ at a high concentration is not commercially available and is difficult to obtain. Commercially available optical fibers are doped with $GeO_2$ in a less amount; therefore, it is difficult to give sharpness required for a probe by only chemical treatment of the commercially available fiber and to use them as a probe for the PSTM.

Incidentally, at present, coming generation optical recording media are being developed for high density recording. Thus, it is also desired to develop optical fibers suitable for recording the media.

SUMMARY OF THE INVENTION

Accordingly, an object of the present invention is to provide arts which can be helpful for a PSTM probe, even if commercially available optical fibers are used.

Another object of the invention is to provide an optical fiber matching high density optical recording media.

According to an aspect of the present invention, there is provided an optical fiber comprising a core for transmission of light, and a clad which has a smaller refractive index than that of the core and with which the core is covered, an tip portion of the core comprising the most pointed portion which is in a conical form and has the top of an acute angle of θ1, and a core tip peripheral portion which is contiguous to the most pointed portion and has a slant of a gentler Incline than the acute angle θ1.

The optical fiber according to the invention has, in its core tip, the most pointed portion with a steeper slant than that of the core tip peripheral portion corresponding to the tip of conventional optical fibers. The most pointed portion can have a sufficiently acute angle. The optical fiber is therefore suitable for, in particular, the PSTM.

According to another aspect of the invention, there is provided a method for manufacturing the above-mentioned optical fiber, comprising the steps:

chemical etching a tip of an optical fiber comprising a core for transmission of light, and a clad which has an refractive index smaller than that of the core and which the core is covered with; and locally heating the center of the tip of the etched core or the peripheral of the center.

In this process, portions corresponding to both the core tip peripheral portion and the tip portion of the clad, which is contiguous to the core tip peripheral portion, can be formed by the step of chemical etching. By the subsequent locally heating step, the center portion of the core or the peripheral thereof is further sharpened and curvature radius of the tip is made smaller to present the most pointed portion of the core.

PREFERRED EMBODIMENTS OF THE INVENTION

First, embodiments of the optical fiber according to the present invention will be described about a manufacturing method thereof.

In the first step, an optical fiber which is, for example, for communication is prepared. As is well-known, such an optical fiber comprises a core for light transmission encircled with a clad whose refractive index is smaller that of the core.

The optical fiber may be selected from any types thereof. It is sufficient to use a commercially available one, not special optical fibers such as a fiber doped with $GeO_2$ at a high concentration. In commercially available optical fibers, a coating is applied to a clad. In the invention, the coating is removed off.

Figure 1:
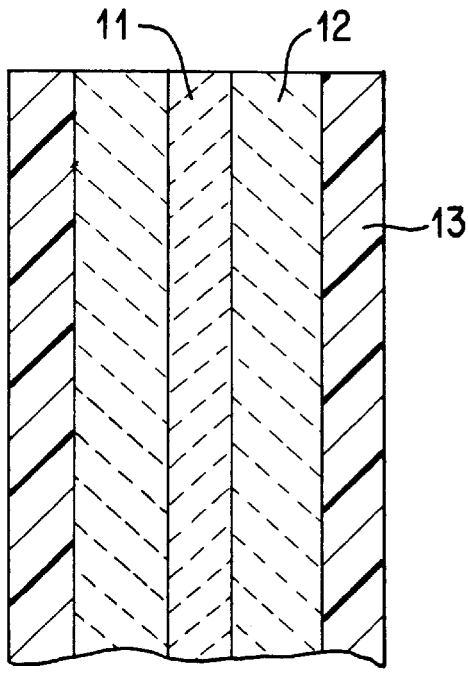
FIG. 1 is a schematic section view of an optical fiber coated with a resin.

The circumferential surface of the clad of the optical fiber is coated with a polymer resin such as an enamel resin, and then its tip portion is cut to have a flat face as illustrated in FIG. 1, which is a schematic section view. In other words, an optical fiber is produced which has a layered structure of a core 11 (a central portion), a clad 12 and a resin-coat layer 13 (an outside portion) and which has a flat tip face. By the resin-coat layer, etching is controlled at portions other than the tip portion, in the next step, i.e., chemical etching step.

Figure 2:
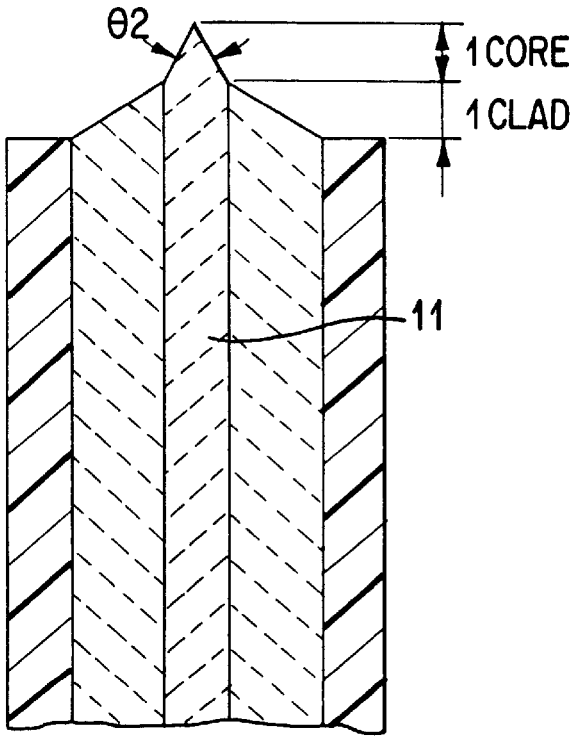
FIG. 2 is a schematic section view of the optical fiber etched chemically.

The tip portion of the optical fiber illustrated in FIG. 1 is immersed into a chemical etching solution so as to etch the portion chemically. The chemical etching solution may be selected from any type ones, depending on materials constituting the optical fiber. Conventionally, a hydrofluoric acid base etching solution is used. By this step, the optical fiber is allowed to change into a form in which its core has the tip portion of angle θ2, as shown in FIG. 2.

After the above-mentioned step, the resin-coat layer 13 is dissolved in an organic solvent and removed off with it.

Figure 3:
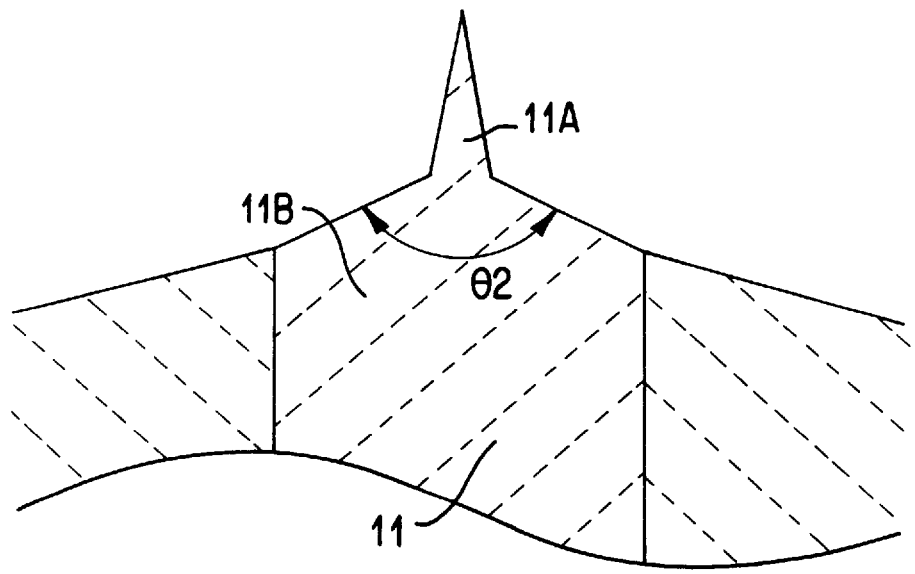
FIG. 3 is a schematic section view of the optical fiber whose tip is locally heated.

Then, only the tip portion of the core 11 is locally heated. As a result, the heated core 11 is melted so that a projected portion is formed. Thus, the tip of the core can be sharpened. That is, as illustrated in FIG. 3, in the optical fiber the central portion of the core 11 turns to a cone having a sharper angle, so that the most pointed portion 11A is formed. Furthermore, the core portion around the most pointed portion turns to a core tip peripheral portion contiguous to the most pointed portion 11A and having a gentler slant than that of the portion 11A.

The manner for locally heating is not limited so far as the optical fiber can be turned to the above-mentioned form. As this manner, however, it is preferred to use radiation of a charged particle beam, in particular an electron beam. The radiation of an electron beam may be conducted by, for example, an electron beam radiating device or by the following method. That is, an electron microscope for observation is used in such a manner that the diameter of electron beam therefrom will be narrower than that of the electron beam for observation.

From the viewpoint of, for example, easy processability of the tip, it is preferred to apply a charged particle beam to the optical fiber from the transverse side thereof.

When the tip portion of the optical fiber is sharpened by the charged particle beam, a flat tip face of the fiber makes it impossible to apply the beam to the center of the core from the transverse direction thereof. Therefore, the tip portion of the optical fiber is beforehand formed into a conical shape so that It will be easy to apply the beam to the central portion of the tip. Application or radiation of the beam to the tip causes a size effect, so that it will be easy to melt the core. The angle θ2 of the conical core formed by chemical etching is an angle sufficient to carry out the chemical etching easily.

Metal vapor deposition is applied to the optical fiber thus obtained, and then the deposited metal film is removed from only the most pointed portion by chemical etching so that the optical fiber can be used as a probe for the PSTM. The maximum diameter of the portion of the core 11 from which the metal film is removed will correspond to the aperture diameter of the probe. If more acute is the angle of the most pointed portion of the probe (i.e., the angle θ1 of the most pointed portion 11A of the core. See the enlarged view of the tip of the core 11, shown in FIG. 4), the aperture diameter is smaller so that resolution becomes higher. Furthermore, the diameter of the spot from which light is radiated becomes smaller. On the contrary, if the angle of the most pointed portion of the probe is larger, the aperture diameter is larger so that resolution becomes lower. In fact, It is difficult to give an angle of 10 or less degrees as the tip angle of the most pointed portion. Thus, it is appropriate to give an angle from 10 to 30 degrees, which is easy to obtain and allows s small aperture diameter.

The curvature radius r (see FIG. 4) of the tip of a probe for the PSTM, which is for obtaining information on an area or object smaller than diffraction limitation of light, must be even smaller than the wavelength of light used. As the curvature radius of the tip portion is smaller, resolution is higher. Therefore, it is desired that the curvature radius of the tip portion ranges from 40 to 50 nm. However, if the curvature radius would be too small, the detection-sensitivity would decrease. Thus, the curvature radius r is preferably from 10 to 50 nm, and more preferably from 10 to 40 nm for both considerable good sensitivity for detecting evanescent light and high resolution.

In the case in which the face contiguous to the conical tip of a probe is flat, the flat face or the edge portion thereof may undesirably contact a sample to be observed when the probe approaches the sample or scans on the sample. On the other hand, according to the process for manufacturing an optical fiber of the invention, the face contiguous to the most pointed portion 11A of the fiber has an incline, so that the possibility will decrease that other portions than the most pointed portion of the fiber contact the sample. Therefore, the angle θ2 of the incline of the core tip peripheral portion is less than 180 degrees, and more preferably from 30 to 120 degrees, which can be easily obtained by chemical etching.

In the present process for manufacturing an optical fiber, during the step of chemical etching, it is possible to mainly control etching of the clad 12, since the side portion of the fiber is coated with the polymer. As a result, lengths of the conical clad 12 and core 11 can be shortened than those of conventional fibers (see FIG. 2). This makes it possible to improve mechanical strength of the probe exhibited when it is scanned.

The optical fiber according to the present invention can be used for various application such as a probe for detecting or radiating light, for example, a probe for the PSTM, a recording means for recording on an optical recording material, or a means for minutely processing an article at a molecular level with a laser.

The optical fiber according to the invention can be used for a probe which has high resolution, sensitivity and operatability. The optical fiber is easily available and inexpensive, since commercially available fibers may be used as a raw material. Thus, it is suitable for detection and radiation of light on a microscopic area, high density recording, and minute work at a molecular level.

EXAMPLES

Example 1

The circumferential surface of a commercially available optical fiber (a single mode fiber, a crystal base fiber material, clad diameter: 125 μm, core diameter: 9.5 μm, manufactured by Fujikura Ltd.) was coated with a polymer resin 13 (an enamel resin). Subsequently, the tip of the fiber was cut to have a flat face and then immersed into a solution of 47% HF and $H_2O$ (volume ratio=1:1) to etch it at an etching temperature of 19° C. for 2 hours. The resultant was immersed into a solution of 40% $NH_4F$, 47% HF and $H_2O$ (volume ratio=10:1:1) for 2 hours, so that the tip of the fiber was turned into the form as shown in FIG. 2. The angle θ2 was about 30 degrees.

After the etching, the polymer resin on the tip was removed off with an organic solvent.

Figure 4:
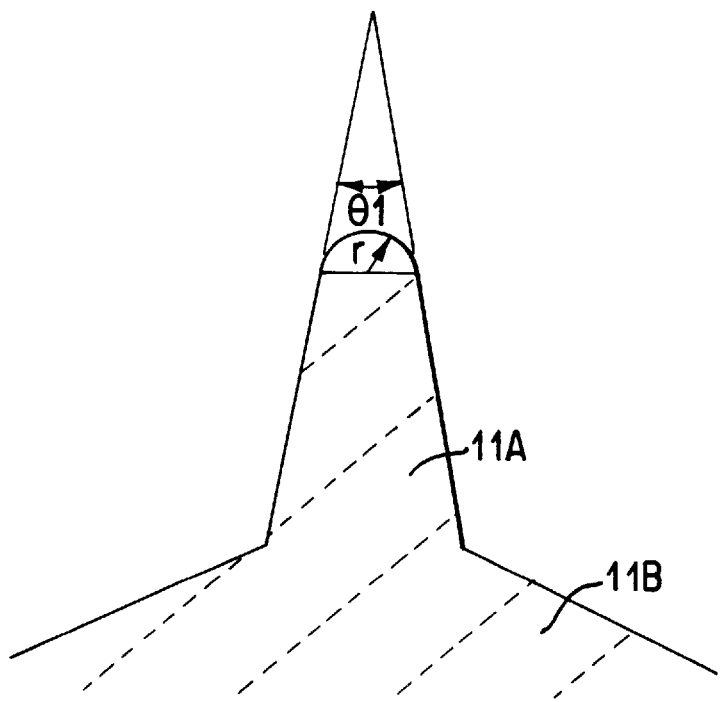
FIG. 4 is an enlarged view of the tip locally heated.

Subsequently, an H-9000 type transmission electroscope (manufactured by Hitachi Ltd.) was used, in such a manner that an electron beam whose diameter was made narrow into μm was radiated to the tip of the optical fiber processed by chemical etching. Thus, only the tip of the fiber was locally heated to be sharpened much more, as illustrated in FIG. 4. Specifically, an optical fiber for a probe was obtained which had the angle of the most pointed angle θ1 of about 20 degrees, θ2 of about 30 degrees, and a curvature radius of 20–30 nm.

Example 2

In the same manner as described above, an optical fiber was coated with a polymer resin. Then, the fiber was immersed into the solution of HF and $H_2O$ for about 30 minutes, and then immersed into the solution of $NH_4F$, HF and $H_2O$ for 6 hours. In this case, the angle θ2 was about 100 degrees.

As for the fiber thus obtained, the length of the conical clad portion ($1_{clad}$) was less than about 200 μm, the length of the core portion ($1_{core}$) was about 10 μm (see FIG. 2). It should be in particular noted that the length of $l_{core}$ was about one-tenth of the length obtained in the case in which the etching was conducted, as reported conventionally, without applying the resin-coat. Thus, mechanical strength was improved. After the etching, the polymer resin on the tip was removed off with an organic solvent.

Subsequently, an H-9000 type transmission electroscope (manufactured by Hitachi Ltd.) was used, in such a manner that an electron beam whose diameter was made narrow into 5 μm was radiated to the tip of the optical fiber processed by chemical etching. Thus, only the tip of the fiber was locally heated to be sharpened much more, as illustrated in FIG. 4. Specifically, an optical fiber for a probe was obtained which had the angle of the most pointed angle θ1 of about 20 degrees, θ2 of about 100 degrees, and a curvature radius of 20–30 nm.

What is claimed is:

1. An optical fiber comprising:
   a core for transmission of light, and a clad which has a smaller refractive index than that of the core and with which the core is covered;
   a tip portion of the core comprising a most pointed portion which is in a conical form and has a top forming an acute angle θ1, and said tip portion comprising a core tip peripheral portion which is contiguous to the most pointed portion, has a slant of a gentler incline than the most pointed portion, and forms an angle θ2.

2. The optical fiber according to claim 1, wherein a curvature radius (r) of the top of the most pointed portion meets the following expression:

$10$ nm $\leq r \leq 50$ nm.

3. The optical fiber according to claim 1, wherein a curvature radius (r) of the top of the most pointed portion meets the following expression:

$10$ nm $\leq r \leq 40$ nm.

4. The optical fiber according to claim 1, wherein the acute angle θ1 and the angle θ2 meet the following expressions, respectively:

$10$ degrees $\leq \theta 1 \leq 30$ degrees, and $\theta 2 < 180$ degrees.

5. The optical fiber according to claim 3, wherein the acute angle θ1 and the angle θ2 meet the following expressions, respectively:

$10$ degrees $\leq \theta 1 \leq 30$ degrees, and $\theta 2 \leq 180$ degrees.

6. The optical fiber according to claim 1, wherein the acute angle θ1 and the angle θ2 meet the following expressions, respectively:

$10$ degrees $\leq \theta 1 \leq 30$ degrees, and $30$ degrees $\leq \theta 2 \leq 120$ degrees.

7. The optical fiber according to claim 3, wherein the acute angle θ1 and the angle θ2 meet the following expressions, respectively:

$10$ degrees $\leq \theta 1 \leq 30$ degrees, and $30$ degrees $\leq \theta 2 \leq 120$ degrees.

8. The optical fiber according to claim 1, which is for a probe.

9. The optical fiber according to claim 8, wherein the probe is a probe for a photon scanning tunneling microscope.

10. The optical fiber according to claim 1, which is for recording on a recording medium.

11. A method for manufacturing an optical fiber, comprising:
    chemically etching a tip of the optical fiber, the optical fiber comprising a core for transmission of light, and a clad which has an refractive index smaller than that of the core and with which the core is covered; and
    locally heating the center of the tip of the etched core or the peripheral of the center of the tip of the etched core by radiating a charged particle beam.

12. The method according to claim 11, wherein the charged particle beam is an electron beam.

13. The method according to claim 11, wherein the charged particle beam is radiated to the center of the tip of the etched core or the peripheral of the center, from the transverse direction of the optical fiber.

14. The method according to claim 11, wherein the charged particle beam is radiated by using a microscope for observation.

15. A method for manufacturing an optical fiber, comprising:
    chemically etching a tip of the optical fiber, the optical fiber comprising a core for transmission of light, and a clad which has an refractive index smaller than that of the core and with which the core is covered;
    locally heating the center of the tip of the etched core or the peripheral of the center of the tip of the etched core; and
    applying a resin onto a circumferential surface of the optical fiber.

16. A method for manufacturing an optical fiber as claimed in claim 1, the method comprising:
    chemically etching a tip of the optical fiber; and
    locally heating the center of the tip of the etched core or the peripheral of the center of the tip of the etched core.

* * * * *